Patented Aug. 10, 1943

2,326,522

UNITED STATES PATENT OFFICE 2,326,522

DIESEL FUEL

Gould H. Cloud, Linden, and William J. Sparks, Elizabeth, N. J., assignors to Standard Oil Development Company, a corporation of Delaware No Drawing. Application October 18, 1940, Serial No. 361,722

8 Claims. (Cl. 44—57)

This invention relates to fuels for high-speed compression-ignition engines of the Diesel type, and is concerned particularly with improving the ignition qualities of hydrocarbon base Diesel fuels.

An object of this invention is to improve the ignition qualities of Diesel fuels by treating adaptable hydrocarbon base fuels with a compound containing a halogen-oxygen function, as, for example, an organic hypochlorite or a similar compound. Another object is to provide a method of reducing unstable components in the fuels. A further object is to provide a method of accelerating ignition of fuels in Diesel engines upon their injection into the combustion zone during the compression cycle.

In accordance with the present invention, it is found that compounds containing a halogen-oxygen function when added to a petroleum Diesel fuel distillate satisfactorily increase the cetane number of the fuel and form a stable fuel composition even though compounds containing such functions may tend to react with unstable components in the fuel.

In general, hypochlorite esters of aliphatic alcohols (alkyl hypochlorites) may be used for the treatment of Diesel fuel, but the hypochlorites of tertiary aliphatic alcohols having from 4 to 6 carbon atoms, e. g. ter-butyl hypochlorite, are preferred, because these compounds have a relatively high degree of stability. However, other organic compounds containing halogen-oxygen functions which make them serve in a similar manner, may also be used as treating agents. Such compounds may be formed in situ in the oil through the reaction of hypochlorous acid or of inorganic hypochlorites.

In treating a relatively saturated petroleum Diesel fuel distillate from a Colombian crude oil, it was found that some reaction took place between unstable components of the fuel and the organic hypochlorite, as indicated by evolution of heat. It has been observed that reaction between the hypochlorite and unsaturated hydrocarbons takes place very readily at ordinary or slightly elevated temperatures, particularly in the presence of sunlight or a metal halide catalyst, e. g. stannic chloride, some of the hypochlorite combining with the unsaturated hydrocarbons. In carrying out a reaction between a highly unsaturated hydrocarbon, such as a diolefinic polymer, and an organic hypochlorite, it has been observed that the hypochlorite adds to the double bonds by a reaction which may be described as a chloro-alkoxylation. Upon analysis, the product showed a chlorine content of 18.7% which is an amount equivalent to 96% of that required theoretically for saturation of the double bonds in the unsaturated hydrocarbon by addition of the chloro and the alkoxy groups to form chloroethers. Similarly, it is possible to treat an unsaturated Diesel fuel or to add to a Diesel fuel the unsaturated hydrocarbon addition product obtained by a treatment with an organic hypochlorite.

Example

A 40-cetane number hydrocarbon gas oil fuel was treated with 5% by volume of ter-butyl hypochlorite. Upon addition of the hypochlorite some heat was evolved and a small amount of sludge was precipitated. The treated fuel was separated from the precipitated sludge and was supplied to a C. F. R. Diesel engine for test. The cetane number of the fuel was found to be improved to 48($\pm$1) which is a significantly practical increase in the ignition quality of the fuel.

The hypochlorites have a tendency to react with sulfur-, oxygen-, and some of the unstable unsaturated compounds in the Diesel fuel to form sludge precipitates. The sludge precipitate may be removed from the fuel by decanting the treated fuel, by filtration, or contact with adsorbent materials, such as clay, leaving the fuel in a purified and more stable condition.

The exact manner in which a Diesel fuel that reacts with a hypochlorite is improved is not at present fully understood, but some of the improvement in ignition quality is attributable to the halogen-alkoxy derivatives, as well as to the organic halogen-oxygen treating agent blended with the fuel.

A number of other halogen-oxygen containing compounds have effects on Diesel fuels similar to those of organic hypochlorites and tend to react with components of the fuel to different degrees; yet these also function as ignition accelerators. For example, in place of the organic hypochlorites may be used chloroxy, iodoso, iodoxy, or analogous halogen derivatives in which a carbon atom in an organic group is combined through the halogen atom to oxygen in a group represented by the type formula $-XO_n$, in which X represents a halogen and $O_n$ represents from 1 to 4 oxygen atoms.

When the halogen is linked to more than one oxygen atom, it is preferred to have the halogen present in the nucleus of an aromatic hydrocarbon radical (Ar), since the aliphatic compounds containing a halogen, linked to more than one oxygen atom, tend to be relatively more unstable. The aromatic compounds are, in general, represented by the formulae $ArXO_n$, wherein Ar stands for an aromatic radical, which may be a substituent, organic or additional inorganic substituents, X represents a halogen, and $O_n$ represents one or more oxygen atoms. Specific examples of these types of compounds are iodoso and iodoxy benzene.

Among the aliphatic hypochlorites used as treating and blending agents may be present some of the more highly oxidized compounds, such as chlorites, chlorates, or perchlorates in small proportions. It has been found possible to prepare aliphatic compounds containing chlorine linked to more than one oxygen atom and to admix them with hydrocarbon Diesel fuels, but on account of their high acitvity, it was found best to admix them with the fuel in the combustion chamber of the engine, by adding them to the intake air. It was found that these compounds, like the hypochlorites, but to a greater degree tend to react with the fuel, but are more stable as the aliphatic hydrocarbon group to which they are attached contains more carbon atoms, and more particularly if they are attached to a tertiary carbon atom.

One method used to prepare compounds of the type $RClO_n$, wherein $n$ is an integer ranging from 2 to 4, and R is an alkyl radical, is by reaction of a dialkyl sulfate with a salt of the chlorine- and oxygen-containing acid, e. g. magnesium perchlorate.

In the practice of this invention any hydrocarbon oil adapted as a fuel for high compression ignition engines of the Diesel type with an ignition quality lower than desired may be improved in the prescribed manner. Ordinarily, the hydrocarbon fuel base to be used has a boiling range above that of gasoline and more particularly a boiling range and viscosity of a petroleum distillate boiling within the range of about 375° F. to about 700° F., such as a gas oil fraction.

The amount of treating or blending agent added to the hydrocarbon base stock may vary from that given in the test described. In general, about 1% to 8% by weight is sufficient, but the exact amount depends upon the particular effectiveness of the agent and the extent to which the agent is soluble and tends to react with the fuel components.

As indicated by the illustrative tests, the described agents are useful for improving low quality Diesel fuel base stocks, as well as higher quality stocks and may be blended with a refined hydrocarbon base stock, and may be used in effecting a refining treatment of a fuel. In general, it is to be blended with a Diesel fuel having a flash point of at least 150° F. Other addition agents, for example, other ignition quality promoters, pour point depressants, viscosity improvers, oiliness agents, anti-oxidants, corrosion inhibitors, etc., may be blended together with these agents in a fuel as needed or desired.

It will be apparent that a number of modifications and variations of the invention as hereinbefore set forth, may be made without departing from the spirit and scope thereof.

We claim:

1. The method of improving a Diesel fuel, which comprises treating a Diesel fuel oil with a hypochlorite ester which is reactive with unsaturated hydrocarbons, and separating from the hydrocarbons a small amount of sludge precipitate formed in said treatment while retaining with the hydrocarbons unreacted hypochlorite ester and oil-soluble addition products thereof.

2. A Diesel fuel oil containing in solution a hypochlorite ester of an alcohol and oil-soluble chloro-ether derivatives thereof in sufficient amount to substantially raise the cetane number of the fuel.

3. A fuel of improved ignition quality for Diesel engines comprising a Diesel fuel and admixed with a hypochlorite ester which is capable of combining with unsaturated hydrocarbons.

4. A fuel of improved ignition quality of Diesel engines comprising a Diesel fuel and tertiary butyl hypochlorite admixed in a minor but sufficient quantity to substantially increase the cetane number of the fuel.

5. An improved Diesel fuel comprising a hydrocarbon Diesel fuel oil blended with a minor proportion of an organic hypochlorite.

6. A Diesel fuel comprising a hydrocarbon Diesel fuel oil blended with a tertiary alkyl hypochlorite in sufficient amounts to increase the cetane number of the fuel.

7. A Diesel fuel comprising a hydrocarbon Diesel fuel oil blended with an aliphatic chloroether.

8. A Diesel fuel comprising a hydrocarbon Diesel fuel oil blended with an organic hypochlorite in a sufficient amount to increase the cetane number of the fuel.

GOULD H. CLOUD.
WILLIAM J. SPARKS.